Figure 1:
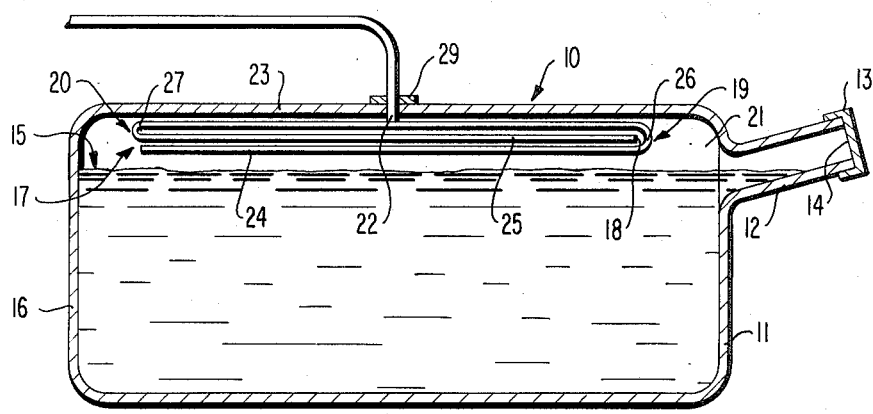

United States Patent [19]
Andres

[11] 3,817,421
[45] June 18, 1974

[54] INSTALLATION FOR THE VENTING OF FUEL TANKS

[75] Inventor: Rudolf Andres, Sindelfingen, Germany

[73] Assignee: Daimler-Benz Aktiengesellschaft, Stuttgart-Unterturkheim, Germany

[22] Filed: Sept. 10, 1971

[21] Appl. No.: 179,493

[30] Foreign Application Priority Data
Sept. 11, 1970 Germany.......................... 2045004

[52] U.S. Cl. ........ 220/85 VR, 137/587, 220/85 US, 220/86 R
[51] Int. Cl. ...................... B65d 25/00, F16k 45/00
[58] Field of Search ......... 220/86 R, 85 UR, 85 US; 137/587, 583

[56] References Cited
UNITED STATES PATENTS
3,187,935  6/1965  Lense.............................. 220/86 R
3,542,239  11/1970  Latvaia........................... 220/85 VR
3,643,690  2/1972  Sarai............................... 220/86 R
3,666,139  5/1972  Urban............................. 220/85 US Primary Examiner—George E. Lowrance
Attorney, Agent, or Firm—Craig & Antonelli

[57] ABSTRACT

A vent system for fuel tanks, especially for motor vehicles, in which two vent lines are connected together within the upper central area of the tank whereby each line section extends from its inlet opening near a respective end of the tank toward the other end and then back toward the connection with the other line section so that each vent line extends at first over a substantial part of the length of the tank before being led back to the center area where the interconnection of the two line sections with each other and with the line leading into the atmosphere takes place.

5 Claims, 2 Drawing Figures

PATENTED JUN 18 1974　　3,817,421

INVENTOR
RUDOLF ANDRES

BY Craig, Antonelli & Hill
ATTORNEYS

INSTALLATION FOR THE VENTING OF FUEL TANKS

The present invention relates to an installation for the venting of fuel tanks, especially for motor vehicles, in which two vent lines terminating in the interior space of the tank at opposite ends of the tank or in proximity thereof, are combined ahead of the outlet thereof into the atmosphere above a central area of the tank.

With the known installations of this type as described in German Pat. No. 1,175,097, in case of inclined positions of the tank in which the tank ends adjacent the inlets of the vent lines are located at different heights, fuel leaves by way of one of the two vent lines due to the influence of centrifugal and/or accelerating forces or due to the gas pressure of an air bubble warming up and enclosed on the inside of the tank, and has to be intercepted and collected by a collecting vessel or is lost by way of a collecting line terminating into the atmosphere. An emptying, i.e., discharge of the collecting vessel back into the tank interior space is achieved in the prior art in that the collecting vessel is connected with the atmosphere.

The task underlying the present invention essentially consists in providing an installation of the aforementioned type in which the expenditures for a collecting vessel as well as the discharge or escape of fuel out of the tank under the described circumstances is avoided. The problems underlying this task are solved according to the present invention in that each of the two line sections, disposed between the interconnection and the tank interior space, is extended from its inlet opening into the tank interior space toward an opposite end of the tank and from the latter is returned to the junction disposed close to the tank upper portion with the other line section.

It is achieved by the present invention that in the inclined positions of the tank, the fuel which has entered one vent line up to the junction, is fed back into the tank interior space directly at the place of the junction by way of the other vent line. The collecting vessel can thus be economized by the fuel tank return according to the present invention. Furthermore, the structural expenditures of the installation according to the present invention are particularly small due to the location of the junction or interconnection of the vent lines in accordance with the present invention close to the tank since only one line has to be led out of the tank.

If the arrangement is made in such a manner that the junction of the vent lines is located in the tank interior space, then the fuel tank only requires one opening for the venting.

Accordingly, it is an object of the present invention to provide an installation for the venting of fuel tanks which avoids the aforementioned shortcomings and drawbacks by simple means.

Another object of the present invention resides in an installation for venting fuel tanks which is characterized by simple structure and low cost.

A further object of the present invention resides in a vent system for fuel tanks which dispenses with the need of a collecting vessel to return fuel escaping through the vent line.

A still further object of the present invention resides in a fuel tank for motor vehicles provided with a venting installation which minimizes the number of openings in the tank that require sealing.

Figure 2:
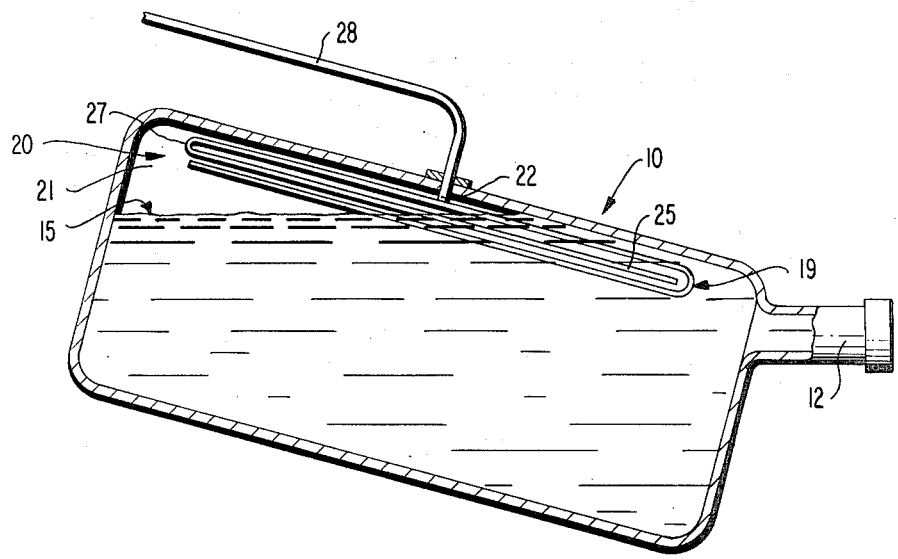

These and further objects, features and advantages of the present invention will become more apparent from the following description when taken in connection with the accompanying drawing which shows, for purposes of illustration only, one embodiment in accordance with the present invention, and wherein:

FIG. 1 is a somewhat schematic view in longitudinal cross section through a motor vehicle fuel tank with a vent system according to the present invention, and FIG. 2 is a schematic view in longitudinal cross section through the motor vehicle fuel tank in FIG. 1 in a rearwardly downwardly inclined position.

Referring now to the drawing wherein like reference numerals are used throughout the two views to designate like parts, the motor vehicle fuel tank generally designated by reference numeral 10 is provided at its rear end with a filler pipe connection 12 which is closed in a pressure tight manner by a detachable cover 13. The maximum fuel level 15 is determined by the lower edge of the opening 14 of the filler pipe 12.

An inlet opening 17 and 18 of a vent line generally designated by reference numeral 19 and 20 is disposed in the interior space 21 of the tank both near the forward end 16 of the tank 10 as also near the rear end 12 of the tank 10 closely below the tank top or ceiling wall 23. The vent lines 19 and 20 are interconnected or joined at a place 22 above a central area of the tank 10.

Provision is made according to the present invention that the junction or interconnection 22 is located close to the tank ceiling wall 23 and that each line section 24 and 25 of the vent lines 19 and 20 disposed between the respective inlet opening 17 and 18 and the junction 22 is extended at first toward an opposite tank end 11 and 16, respectively to pass over into line elbows designated by reference numerals 26 and 27, and from the latter is extended back upon itself to the junction 22. The advantage of this arrangement can be readily seen from FIG. 2. If the fuel is forced into the line section 25, up to the line elbow 27, for example, during the starting or acceleration on a hill, then the fuel flows back into the return line 19 by way of the junction 22. An escape of fuel out of the common vent line 28 downstream of the junction 22 does not generally occur.

The junction or interconnection 22 is located inside the interior space 21 of the tank so that only one single opening 29 (for the line 28) has to be provided at the tank. As a result thereof, the number of places to be sealed at the tank are reduced to a minimum. Furthermore, it is not necessary to arrange a collecting vessel in the line 28.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. An installation for venting fuel tanks comprising:

first and second vent lines arranged within the fuel tank, each of said first and second vent lines including an open end near a side portion of the fuel tank so that one open end of said first and second vent lines is free of fuel during inclination of the fuel tank, an elbow portion near a respective opposite side portion of the fuel tank, a first line portion extending from said open end to said elbow portion, and a second line portion extending from said elbow portion to an interconnection for joining together said second line portions of each of said first and second vent lines to permit fuel flow between said second line portions, said interconnection being arranged within the fuel tank; and an outlet means extending from the interconnection into the atmosphere.

2. An installation according to claim 1, characterized in that the interconnection is disposed close to the upper wall of the tank.

3. An arrangement according to claim 1, characterized in that the second line portions of said first and second vent lines are arranged substantially coplanar.

4. An installation according to claim 3, characterized in that the interconnection is disposed close to the upper wall of the tank.

5. An arrangement according to claim 1, wherein said second line portions of said first and second vent lines are joined in a straight line.

* * * * *